United States Patent
Cherolis et al.

(10) Patent No.: US 8,113,780 B2
(45) Date of Patent: Feb. 14, 2012

(54) CASTINGS, CASTING CORES, AND METHODS

(75) Inventors: Anthony P. Cherolis, Urbana, IL (US); Eric P. Letizia, East Hartford, CT (US); Matthew A. Devore, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 365 days.

(21) Appl. No.: 12/465,862

(22) Filed: May 14, 2009

(65) Prior Publication Data

US 2010/0129217 A1 May 27, 2010

Related U.S. Application Data

(63) Continuation-in-part of application No. 12/275,793, filed on Nov. 21, 2008, and a continuation-in-part of application No. 12/275,777, filed on Nov. 21, 2008.

(51) Int. Cl.
*F01D 5/08* (2006.01)
*F01D 5/20* (2006.01)
(52) U.S. Cl. .................................................. 416/97 R
(58) Field of Classification Search .............. 416/97 R
See application file for complete search history.

(56) References Cited

U.S. PATENT DOCUMENTS

| | | | |
|---|---|---|---|
| 4,542,867 A | 9/1985 | Memmen | |
| 5,348,446 A * | 9/1994 | Lee et al. | 416/241 R |
| 5,700,131 A | 12/1997 | Hall et al. | |
| 5,720,431 A | 2/1998 | Sellers et al. | |
| 5,820,774 A | 10/1998 | Dietrich | |
| 5,931,638 A | 8/1999 | Krause et al. | |
| 6,402,470 B1 * | 6/2002 | Kvasnak et al. | 416/97 R |
| 6,595,748 B2 * | 7/2003 | Flodman et al. | 416/97 R |
| 6,637,500 B2 | 10/2003 | Shah et al. | |
| 6,929,054 B2 | 8/2005 | Beals et al. | |
| 7,014,424 B2 | 3/2006 | Cunha et al. | |
| 7,134,475 B2 | 11/2006 | Snyder et al. | |
| 7,216,689 B2 | 5/2007 | Verner et al. | |
| 7,270,170 B2 | 9/2007 | Beals et al. | |
| 7,270,173 B2 | 9/2007 | Wiedemer et al. | |
| 7,413,403 B2 | 8/2008 | Cunha et al. | |
| 2006/0118262 A1 | 6/2006 | Beals et al. | |
| 2006/0239819 A1 | 10/2006 | Albert et al. | |
| 2007/0044934 A1 | 3/2007 | Santeler | |
| 2008/0145235 A1 | 6/2008 | Cunha et al. | |

FOREIGN PATENT DOCUMENTS

| | | |
|---|---|---|
| EP | 1798374 A2 | 6/2007 |
| EP | 1820937 A2 | 8/2007 |
| EP | 1935532 A1 | 6/2008 |
| EP | 2000232 A1 | 12/2008 |

OTHER PUBLICATIONS

European Search Report for EP09252624.3, dated Mar. 18, 2010.

* cited by examiner

*Primary Examiner* — Michelle Mandala
(74) *Attorney, Agent, or Firm* — Bachman & LaPointe, P.C.

(57) ABSTRACT

A gas turbine engine component has a leading edge and a trailing edge and a pressure side and a suction side. The pressure side and suction side extend between the leading edge and trailing edge. One or more cooling passageways extend through the airfoil and comprise a trunk extending from an inlet. At the inlet, there is an additional passageway adjacent the trunk and having at least one edge recessed relative to the trunk.

19 Claims, 6 Drawing Sheets

CASTINGS, CASTING CORES, AND METHODS

CROSS REFERENCE TO RELATED APPLICATIONS

This is a continuation-in-part application of Ser. No. 12/275,777, filed Nov. 21, 2008, and entitled CASTINGS, CASTING CORES, AND METHODS and of Ser. No. 12/275,793, filed Nov. 21, 2008, and entitled CASTINGS, CASTING CORES, AND METHODS, the disclosures of which are incorporated by reference herein in their entireties as if set forth at length.

U.S. GOVERNMENT RIGHTS

The invention was made with U.S. Government support under contract F33618-03-D-2354-009 awarded by the U.S. Air Force. The U.S. Government has certain rights in the invention.

BACKGROUND

The disclosure relates to investment casting. More particularly, it relates to the investment casting of superalloy turbine engine components.

Investment casting is a commonly used technique for forming metallic components having complex geometries, especially hollow components, and is used in the fabrication of superalloy gas turbine engine components. The disclosure is described in respect to the production of particular superalloy castings, however it is understood that the disclosure is not so limited.

Gas turbine engines are widely used in aircraft propulsion, electric power generation, and ship propulsion. In gas turbine engine applications, efficiency is a prime objective. Improved gas turbine engine efficiency can be obtained by operating at higher temperatures, however current operating temperatures in the turbine section exceed the melting points of the superalloy materials used in turbine components. Consequently, it is a general practice to provide air cooling. Cooling is provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

The cooling passageway sections may be created using ceramic casting cores that are later leached out of the casting to form hollow passageways. Ceramic casting cores may be formed by molding a mixture of ceramic powder and binder material by injecting the mixture into hardened steel dies. After removal from the dies, the green cores are thermally post-processed to remove the binder and fired to sinter the ceramic powder together. The trend toward finer cooling features has taxed core manufacturing techniques. The fine features may be difficult to manufacture and/or, once manufactured, may prove fragile. Commonly-assigned U.S. Pat. Nos. 6,637,500 of Shah et al., 6,929,054 of Beals et al., 7,014,424 of Cunha et al., 7,134,475 of Snyder et al., and U.S. Patent Publication No. 20060239819 of Albert et al. (the disclosures of which are incorporated by reference herein as if set forth at length) disclose use of ceramic and refractory metal core combinations.

SUMMARY

One aspect of the disclosure involves a pattern for casting a component having an airfoil. The pattern comprises a pattern material and a casting core combination. The pattern material has an airfoil. The casting core combination is at least partially embedded in the pattern material. The casting core combination comprises a metallic casting core and at least one additional casting core. The metallic casting core has opposite first and second faces. The metallic core and at least one additional casting core extend spanwise into the airfoil of the pattern material. In at least a portion of the pattern material outside the airfoil of the pattern material, an edge portion of the metallic casting core is recessed relative to the cross-section of an adjacent portion of the at least one additional casting core.

In various implementations, the at least one additional casting core may comprise at least one ceramic feedcore. A trunk of the ceramic feedcore may form the adjacent portion. The component may be a blade wherein the pattern material has a fir-tree root portion and the adjacent portion extends at least partially within the root portion of the pattern material.

Other aspects of the disclosure involve methods for forming the pattern and/or methods for casting using the pattern.

Other aspects of the disclosure involve gas turbine engine components which may be cast from a shell formed from the pattern. An exemplary component (e.g., a blade) has an airfoil having: a leading edge; a trailing edge; a pressure side extending between the leading edge and trailing edge; a suction side extending between the leading edge and trailing edge; and one or more cooling passageways extending through the airfoil and comprising a trunk extending from an inlet. At the inlet there may be an additional passageway adjacent the trunk and having at least one edge recessed relative to the trunk.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
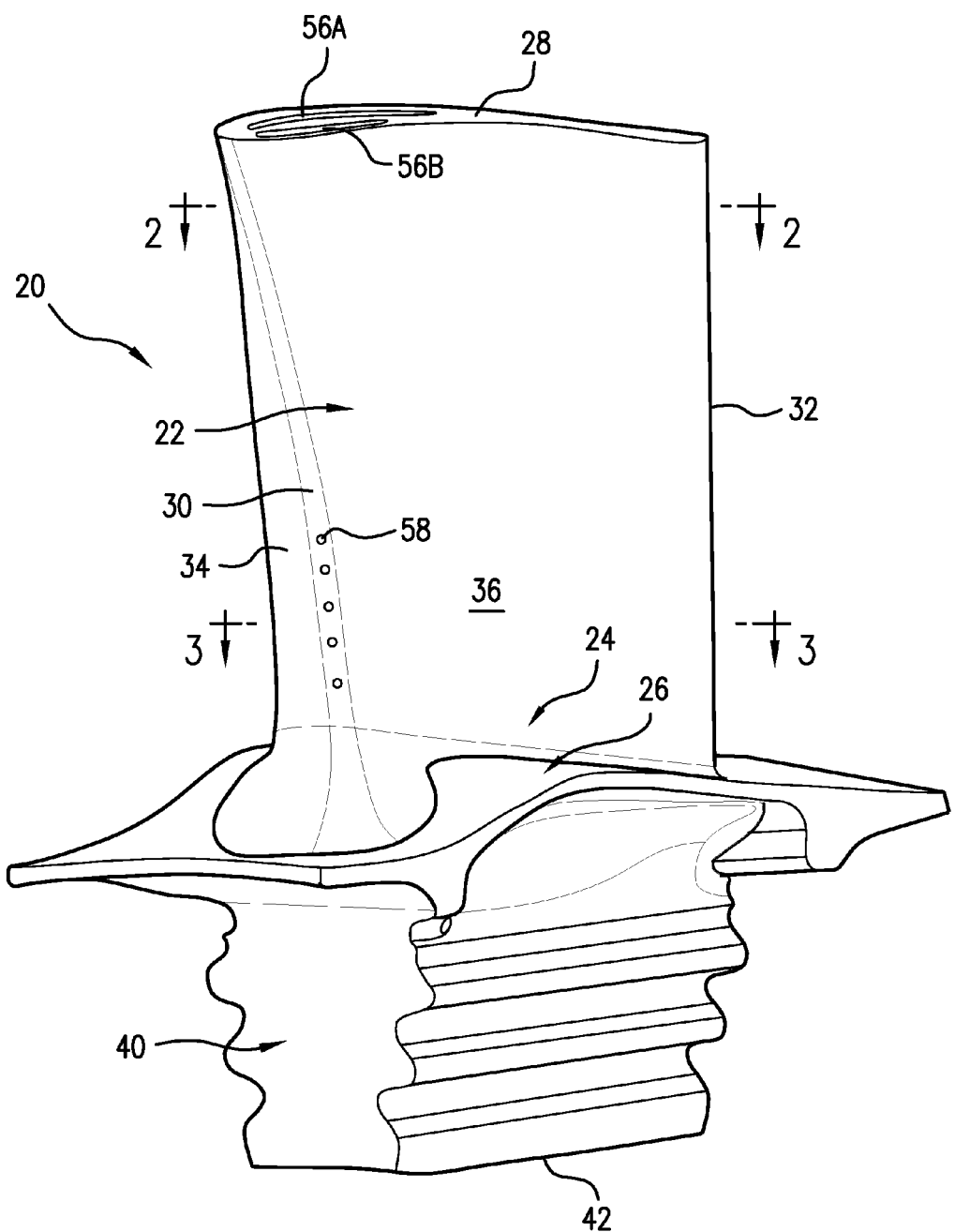
FIG. 1 is a view of a cast blade.

FIG. 1 shows a gas turbine engine blade 20. The blade 20 has an airfoil 22 extending from an inboard end 24 at the outboard surface of an inboard (inner diameter or ID) platform 26 to an outboard end or tip 28. The airfoil has a leading edge 30 and a trailing edge 32. The airfoil has a suction side/surface 34 and a pressure side/surface 36 extending between the leading edge 30 and the trailing edge 32. A convoluted attachment root (a so-called "fir-tree" root) 40 depends from an underside (or inboard surface) of the platform 26 and has an inboard end/surface 42.

Figure 2:
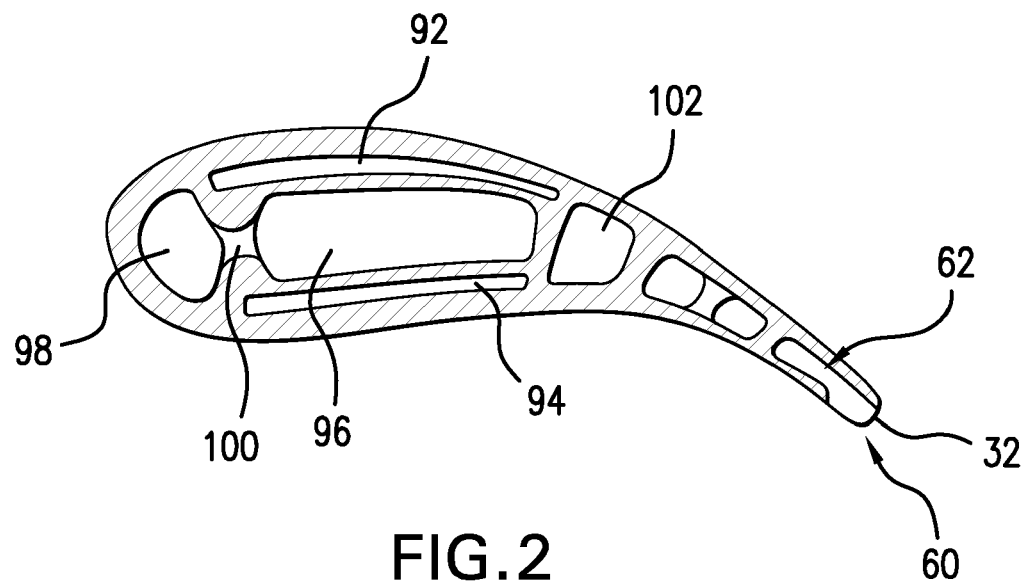
FIG. 2 is a sectional view of the blade of FIG. 1, taken along line 2-2.

The exemplary blade 20 is cast from an alloy (e.g., a nickel-based superalloy) and has an internal cooling passageway system. The exemplary cooling passageway system has a plurality of inlets. The exemplary inlets are along the root 40, more particularly along the inboard end/surface 42. The exemplary blade has inlets 50A-50C, 52A-52C, and 54A-54C (FIG. 4), discussed further below. The exemplary cooling passageway system has a plurality of outlets. The exemplary outlets are along the airfoil 22. The exemplary outlets include outlets 56A and 56B (FIG. 1) along the tip and outlets along the airfoil perimeter. Exemplary outlets along the airfoil perimeter include leading edge outlets 58 and trailing edge outlets 60 (FIG. 2). The exemplary trailing edge outlets 60 are formed by a trailing edge discharge slot 62.

Figure 4:
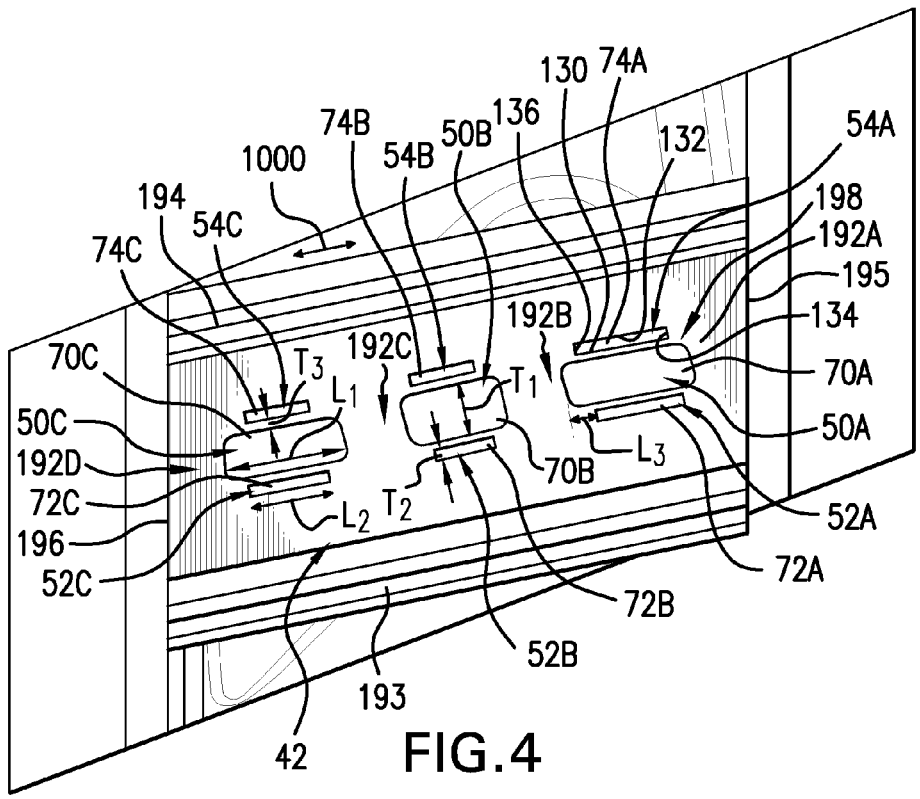
FIG. 4 is a root ID view of the blade of FIG. 1.

The exemplary inlets 50A-50C, 52A-52C, and 54A-54C of FIG. 4 each feed a respective trunk 70A-70C, 72A-72C, and 74A-74C extending radially outward within the root. In the exemplary airfoil, the trunks 70A-70C may each feed one or more spanwise feed passageways within and/or through the airfoil. Each spanwise feed passageway may have one or more spanwise legs (e.g., combinations of up-pass legs toward the tip and down-pass legs back toward the root).

Figure 3:
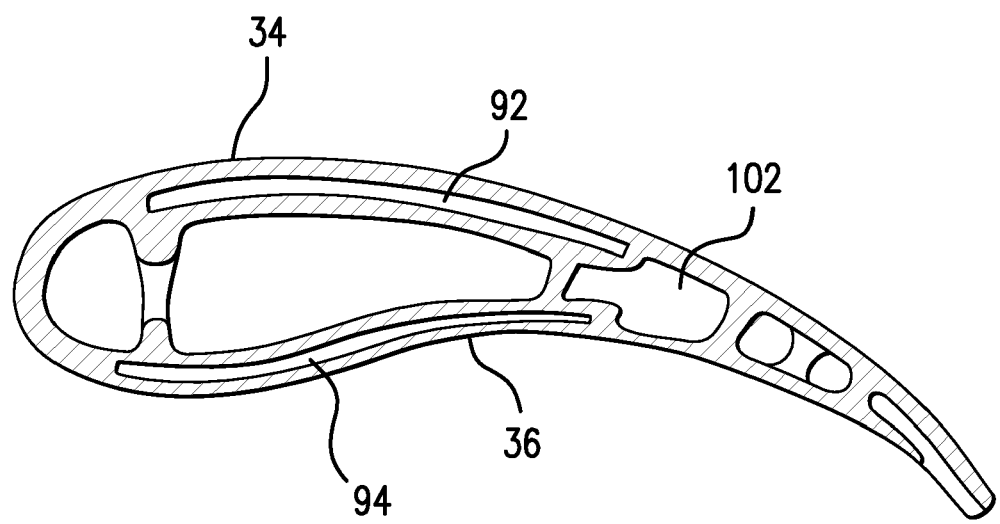
FIG. 3 is a sectional view of the blade of FIG. 1, taken along line 3-3.

The exemplary trunks 72A-72C, however, merge near the platform to define a common spanwise passageway 92 (FIGS. 2&3). Similarly, the exemplary trunks 54A-54C merge to form a common spanwise passageway 94. The exemplary passageways 92 and 94 respectively extend to the tip outlets 56A and 56B. The exemplary passageways 92 and 94 respectively extend adjacent the suction side/surface 34 and pressure side/surface 36.

The exemplary trunks 70A and 70B merge near the platform to define a common spanwise feed passageway 96 (FIG. 2). The exemplary feed passageway 96 extends to a terminal end recessed from the airfoil tip. A leading edge impingement passageway 98 is fed from the passageway 96 via impingement holes 100. The exemplary trunk 70C continues to form a spanwise feed passageway 102 which, in turn, feeds the discharge slot 62.

FIG. 4 shows each of the inlets 52A-52C and 54A-54C and associated trunks 72A-72C and 74A-74C as curving partially around the associated inlet 50A-50C and trunk 70A-70C. Relative to the associated trunk 70A-70C, each of the trunks 72A-72C and 74A-74C has an inboard surface 130 and an outboard surface 132 and extends between lateral edges 134 and 136 (shown, for example, for the trunk 74A). In the exemplary embodiment, each of the trunks is flat or essentially flat (e.g., having mostly a small net bend (e.g., 10°) at least along 90+% of the cross-section). As is discussed below, this may be distinguished from a greater bend and wrapping of the trunks 70A-70C by the associated trunks 72A-72C and 74A-74C disclosed in certain embodiments of Ser. No. 12/275,777.

Figure 6:
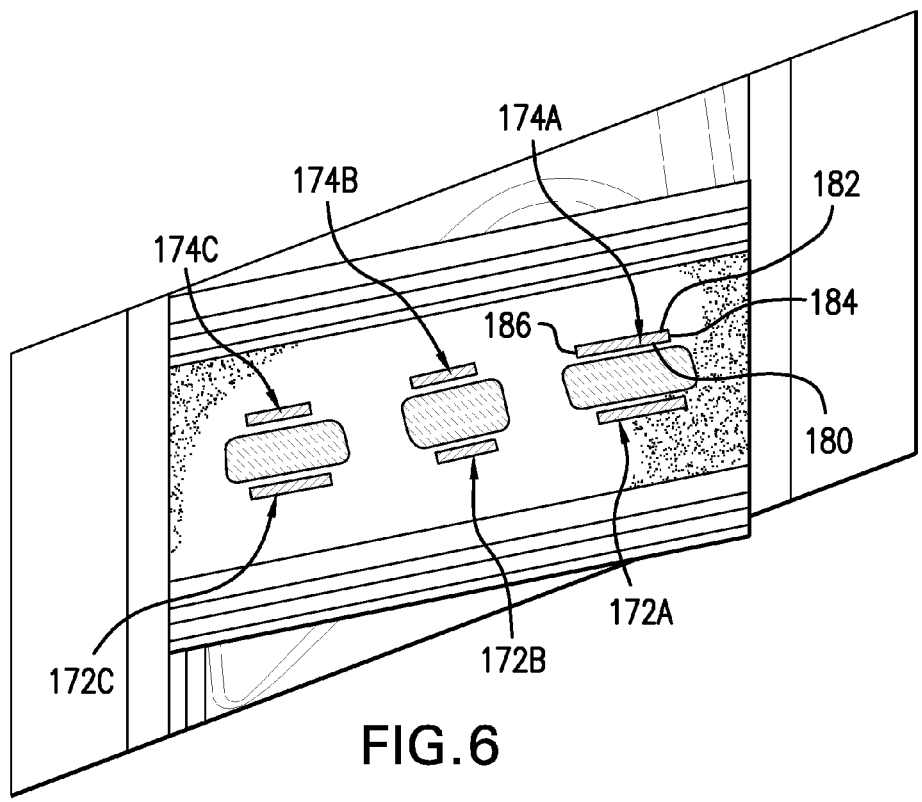
FIG. 6 is a root ID view of the pattern of FIG. 5.
Figure 5:
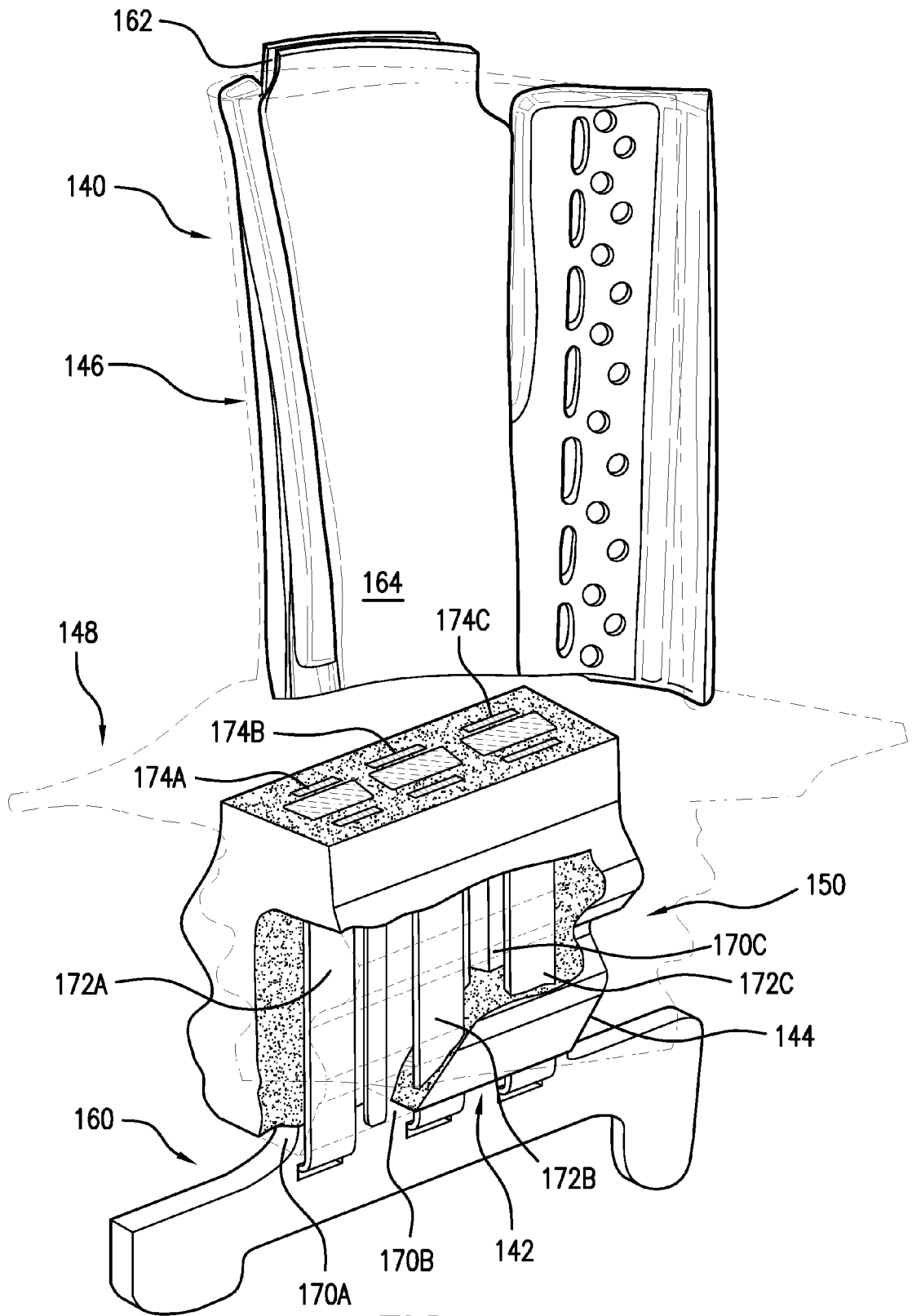
FIG. 5 is a view of a pattern for forming the blade of FIG. 1 partially cutaway and partially with a core assembly shown in solid line and pattern wax shown in broken outline.

FIGS. 5 and 6 show a pattern 140 for casting the blade 20. The exemplary pattern comprises a combination 142 of casting cores (core combination) and a pattern material 144 in which the core combination is at least partially embedded. The pattern material has an external surface generally corresponding to the external surface of the blade 20 (i.e., having an airfoil 146, a platform 148, and a root 150). The core combination 142 has an external surface (complementary to the mating internal surface of the pattern material) generally corresponding to portions of the passageway system. For purposes of illustration, FIG. 5 shows the combination 142 in solid lines and the pattern material 144 in broken lines.

The exemplary core combination 142 is formed as the assembly of one or more ceramic cores 160 and one or more metallic cores 162, 164. In the exemplary core combination 142, the metallic casting cores 162, 164 are refractory metal cores (RMCs). Exemplary RMCs are refractory metal based (i.e., having substrates of at least fifty weight percent one or more refractory metals such as molybdenum, tungsten, niobium, or the like, optionally coated). In the exemplary configuration, the RMC 162 is generally to the suction side of the pattern whereas the RMC 164 is generally to the pressure side.

In the exemplary core combination 142, the one or more ceramic cores 160 include respective trunk portions 170A, 170B, and 170C for casting the respective trunks, 70A-70C. The RMC 162 includes trunk portions 172A, 172B, and 172C for respectively casting the trunks 72A-72C. The RMC 164 similarly includes trunk portions 174A, 174B, and 174C for respectively casting the trunks 74A-74C. Each of the exemplary trunk portions 172A-172C and 174A-174C has an inboard surface 180, an outboard surface 182, and lateral edges 184 and 186, respectively for casting the surfaces 130 and 132 and edges 134 and 136 of the associated trunk.

Figure 8:
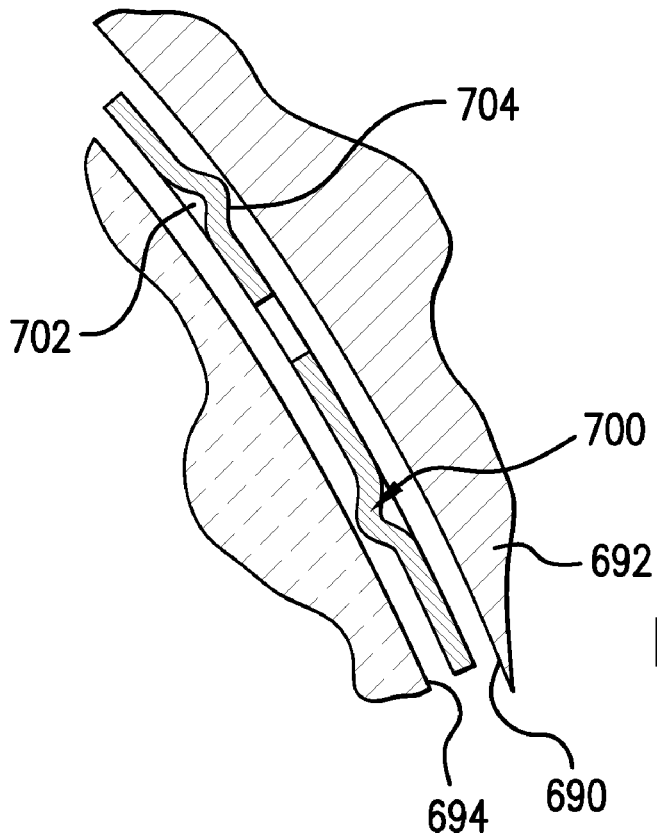
FIG. 8 is a sectional view of a core assembly and pattern-forming die.
Figure 9:
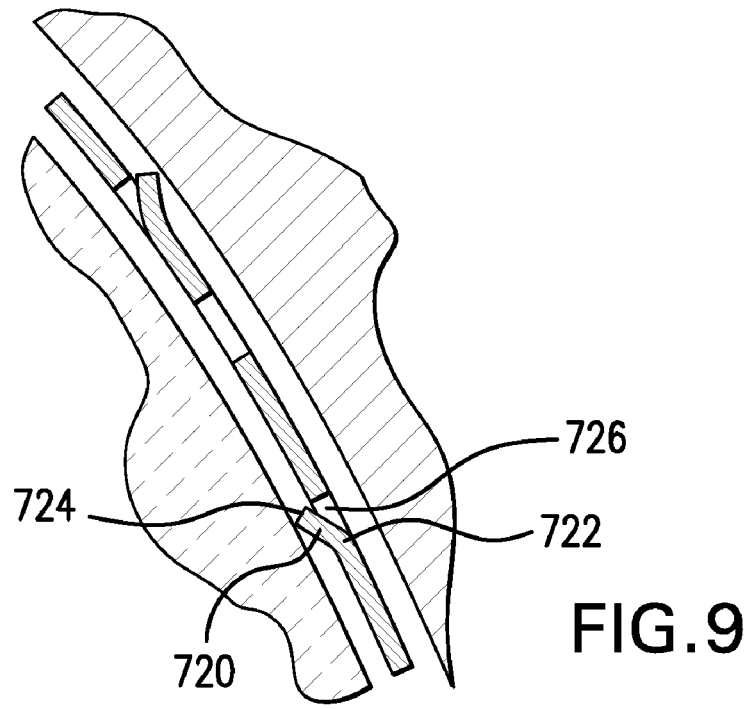
FIG. 9 is a sectional view of a second core assembly and pattern-forming die.

Various means may be provided for further maintaining relative positioning of the RMCs and other cores during molding of the wax pattern. This may include using preformed wax (or other sacrificial material) pads (not shown) sandwiched between adjacent portions of the RMC and the other core (e.g., a feedcore) and/or between the RMC and the adjacent surface 690 of the pattern-molding die 692. Other means for positioning the RMC relative to the other casting core or die may be formed by protrusions from the RMC. The use of non-sacrificial RMC protrusions has the additional benefit of positioning of the RMC relative to the adjacent core and outer ceramic shell during the metal pour. For example, FIG. 8 shows protrusions formed by embossments 700. Exemplary embossments 700 are circular in planform and are formed by embossing a dimple 702 into one face/surface of the RMC producing a protrusion 704 along the other face/surface without perforating the RMC. The protrusions may contact the adjacent surface 694 of the feedcore or die to maintain desired RMC spacing (and thus desired positions of the passages cast by the RMC within the wall of the ultimate casting). As another such positioning means, FIG. 9 shows protrusions formed by tabs 720 partially perforated from the RMC. Each exemplary tab 720 protrudes from one or the other face/surface of the RMC, with a bend at a proximal portion 722 and an end portion 724 positioned to contact or be in close proximity to the associated feedcore or die surface. Exemplary tabs may be square or rectangular in planform (e.g., formed by a cut/perforation 726 along three of the four sides, with the remaining side at the bend along the proximal portion 722). Alternatively, tabs may be triangular in planform (e.g., with the bend/proximal portion along one side) or may be semicircular (e.g., with the bend falling along the diameter of the semicircle or a chord of a similar arcuate shape).

Figure 7:
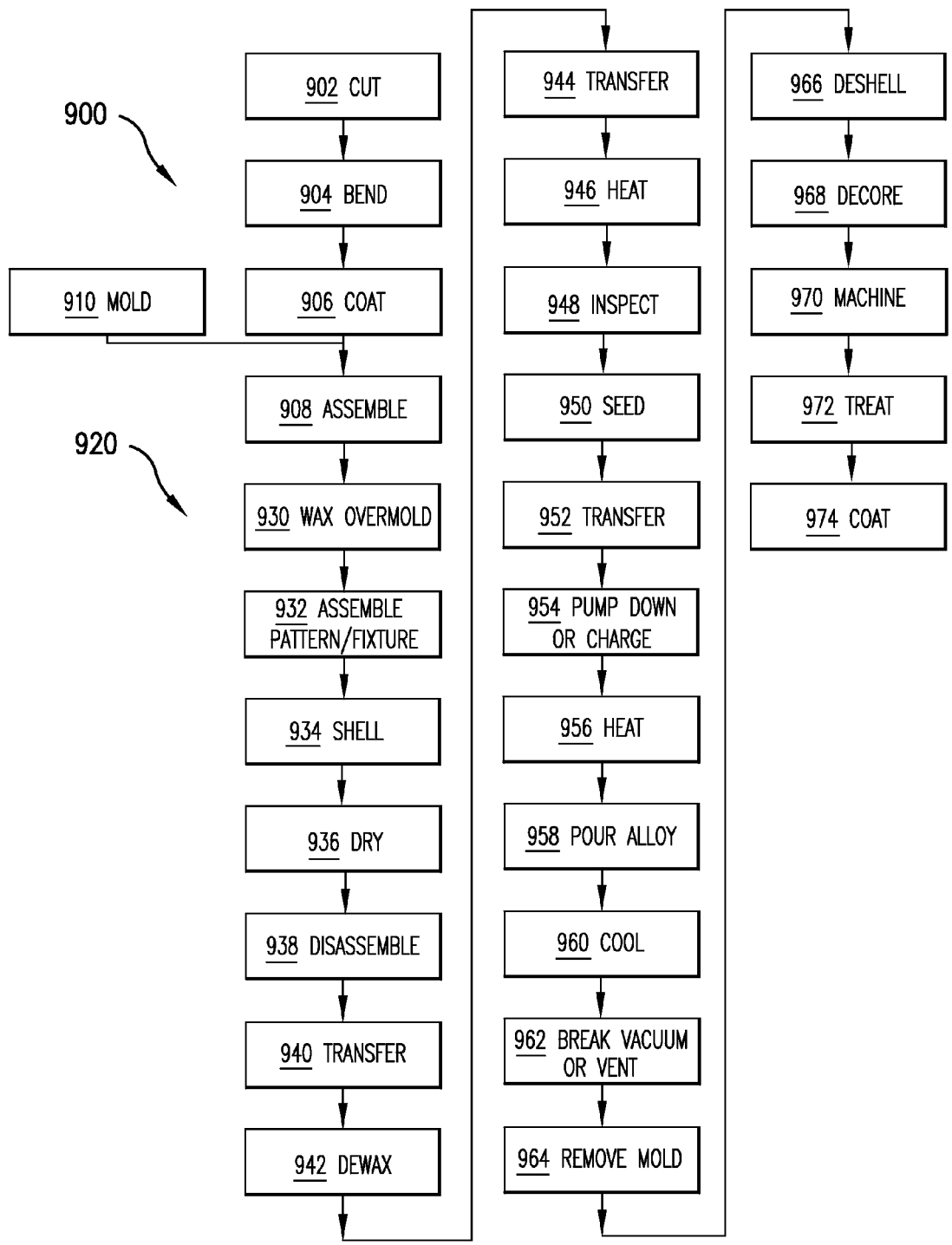
FIG. 7 is a flowchart of a manufacturing process.

Steps in the manufacture 900 of the core assembly and casting are broadly identified in the flowchart of FIG. 7. In a cutting operation 902 (e.g., laser cutting, electro-discharge machining (EDM), liquid jet machining, or stamping), one or more cuttings are cut from a blank for forming the RMCs. The exemplary blank is of a refractory metal-based sheet stock (e.g., molybdenum or niobium) having a thickness in the vicinity of 0.01-0.10 inch (0.2-2.5 mm) between parallel first and second faces and transverse dimensions much greater than that. Each exemplary cutting has the cut features of the associated RMC including the separations between the trunk portions and any holes (e.g., for forming posts or other features in the metallic core).

In a second step 904, if appropriate, each cutting is bent to form any contouring (e.g., to more slightly bend a portion of the metallic core to more closely follow the associated pressure side or suction side of the airfoil). More complex forming procedures are also possible.

The RMC may be coated 906 with a protective coating. Exemplary coating materials include silica, alumina, zirconia, chromia, mullite and hafnia. Coatings may be applied by any appropriate line-of sight or non-line-of sight technique (e.g., chemical or physical vapor deposition (CVD, PVD) methods, plasma spray methods, electrophoresis, and sol gel methods). Individual layers may typically be 0.1 to 1 mil (2.5 to 25 micrometer) thick. Layers of Pt, other noble metals, Cr, Si, W, and/or Al, or other non-metallic materials may be applied to the metallic core elements for oxidation protection in combination with a ceramic coating for protection from molten metal erosion and dissolution.

The RMCs may then be mated/assembled 908 to the feedcore. For example, the feedcore may be pre-molded 910 and, optionally, pre-fired. Optionally, a ceramic adhesive or other securing means may be used. An exemplary ceramic adhesive is a colloid which may be dried by a microwave process. Alternatively, the feedcore may be overmolded to the RMCs. For example, the RMCs may be placed in a die and the feedcore (e.g., silica-, zircon-, or alumina-based) molded thereover. An exemplary overmolding is a freeze casting process. Although a conventional molding of a green ceramic followed by a de-bind/fire process may be used, the freeze casting process may have advantages regarding limiting degradation of the RMCs and limiting ceramic core shrinkage. By locating the mating joint/junction (not shown) between the RMCs and feedcore outside the subsequently overmolded pattern material (and thus outside the final casting) the distinct/separate inlets of the associated feed passageway trunks may be created. Additionally, the chances for forming crystalline irregularities in the casting are reduced (e.g., if a single crystal casting is intended to be cast, an embedded joint may generate growth of distinct local crystals).

FIG. 7 also shows an exemplary method 920 for investment casting using the composite core assembly. Other methods are possible, including a variety of prior art methods and yet-developed methods. The core assembly is then overmolded 930 with an easily sacrificed material such as a natural or synthetic wax (e.g., via placing the assembly in a mold (die) and molding the wax around it). There may be multiple such assemblies involved in a given mold.

The overmolded core assembly (or group of assemblies) forms a casting pattern with an exterior shape largely corresponding to the exterior shape of the part to be cast. The pattern may then be assembled 932 to a shelling fixture (e.g., via wax welding between end plates of the fixture). The pattern may then be shelled 934 (e.g., via one or more stages of slurry dipping, slurry spraying, or the like). After the shell is built up, it may be dried 936. The drying provides the shell with at least sufficient strength or other physical integrity properties to permit subsequent processing. For example, the shell containing the invested core assembly may be disassembled 938 fully or partially from the shelling fixture and then transferred 940 to a dewaxer (e.g., a steam autoclave). In the dewaxer, a steam dewax process 942 removes a major portion of the wax leaving the core assembly secured within the shell. The shell and core assembly will largely form the ultimate mold. However, the dewax process typically leaves a wax or byproduct hydrocarbon residue on the shell interior and core assembly.

After the dewax, the shell is transferred 944 to a furnace (e.g., containing air or other oxidizing atmosphere) in which it is heated 946 to strengthen the shell and remove any remaining wax residue (e.g., by vaporization) and/or converting hydrocarbon residue to carbon. Oxygen in the atmosphere reacts with the carbon to form carbon dioxide. Removal of the carbon is advantageous to reduce or eliminate the formation of detrimental carbides in the metal casting. Removing carbon offers the additional advantage of reducing the potential for clogging the vacuum pumps used in subsequent stages of operation.

The mold may be removed from the atmospheric furnace, allowed to cool, and inspected 948. The mold may be seeded 950 by placing a metallic seed in the mold to establish the ultimate crystal structure of a directionally solidified (DS) casting or a single-crystal (SX) casting. Nevertheless the present teachings may be applied to other DS and SX casting techniques (e.g., wherein the shell geometry defines a grain selector) or to casting of other microstructures. The mold may be transferred 952 to a casting furnace (e.g., placed atop a chill plate in the furnace). The casting furnace may be pumped down to vacuum 954 or charged with a non-oxidizing atmosphere (e.g., inert gas) to prevent oxidation of the casting alloy. The casting furnace is heated 956 to preheat the mold. This preheating serves two purposes: to further harden and strengthen the shell; and to preheat the shell for the introduction of molten alloy to prevent thermal shock and premature solidification of the alloy.

After preheating and while still under vacuum conditions, the molten alloy is poured 958 into the mold and the mold is allowed to cool to solidify 960 the alloy (e.g., after withdrawal from the furnace hot zone). After solidification, the vacuum may be broken 962 and the chilled mold removed 964 from the casting furnace. The shell may be removed in a deshelling process 966 (e.g., mechanical breaking of the shell).

The core assembly is removed in a decoring process 968 to leave a cast article (e.g., a metallic precursor of the ultimate part). The cast article may be machined 970, chemically and/or thermally treated 972 and coated 974 to form the ultimate part. Some or all of any machining or chemical or thermal treatment may be performed before the decoring.

During operational use, the turbine blade fir-tree attachment root is subject to a combination of stresses from differential heating (e.g., hot gas flowing along the airfoil contrasted with cool air flowing into the root) and mechanical loading (engagement forces between the root and disk, both static and dynamic). The mechanical engagement forces result in high compressive loads on the material (ribs) 192A-192D connecting the pressure side 193 and suction side 194 of the fir-tree attachment root between the feed passageway trunks and the leading face 195 and trailing face 196 of the root. For example, as the rotor disk rotates, the mass/inertia of the blade causes a centrifugal loading on the connection provided by the fir-tree attachment root and associated disk slot. This produces a compressive force/stress between the lobes on the pressure side 193 and the associated lobes on the suction side 194. This compressive stress must pass around the trunks 54A-54C. The compressive stress is passed through the ribs 192A-192D.

The compressive stress is concentrated in/by the ribs. The presence of the edges 134 and 136 may yet further increase localized stress. Particularly, if the edges are located in what otherwise would be a high stress region, stresses around the edges are yet further increased. The narrowness of the edges 134, 136 and the sharpness of their corners (if any) with the surfaces 130 and 132 yet further exacerbate local peak stresses. Stress near the surface of the trunks 52A-C and 54A-C might be enough to produce cracks. Additionally, the thermal stresses may be high near the corners of the trunk cross-sections (more relevant along/near the airfoil and less relevant near the ID face of the root). Accordingly, by retracting the edges 134, 136 away from the corners 198 of the cross-sections of the trunks 50A-50C (and thus out of the high stress areas adjacent the ribs) the stress exacerbation/concentration caused by the edges is reduced as is the associated chance of cracking.

For example, FIG. 6 shows the leading lateral edges 184 and trailing lateral edges 186 of the RMC trunks. The lateral edges are recessed relative to the adjacent ceramic feedcore trunk to avoid the stress fields associated with the adjacent extremity of the associated passageway trunks 70C. With both leading and trailing lateral edges of the RMCs 172C and 174C similarly retracted/recessed (leaving only a flat narrow trunk) this limits the trunks' cross-sectional area and flow capacity. Thus, there is a tradeoff between flow capacity and thermal/mechanical stress reduction. If such flat RMCs were widened, extending the edge portions into the stress fields, thermal-mechanical damage could occur (e.g., especially with high centrifugal loading on the blade root at high engine speed). Such centrifugal loading is not present in turbine vane components. Accordingly, greater flexibility may be had in RMC positioning in vanes. For example, copending application Ser. No. 12/275,793 discloses a number of vane embodiments having flat RMC trunks with such relative RMC trunk and ceramic feedcore trunk positioning and dimensioning.

Several alternative frames of reference may be used to identify relative dimensions of the feed trunks and the adjacent RMC-cast passageway trunks. In the exemplary embodiment, the faces of the trunk portions of the RMC and the resulting passageways are parallel to the fir-tree attachment surfaces of the blade root. Thus, a local width of the RMC or passageway (e.g., at the ID face of the root) may be essentially coincident to a length ($L_2$) of the RMC trunk or passageway trunk parallel to the attachment root (direction 1000). Similarly, a thickness between faces of the RMC may be essentially the same as a thickness $T_2$ measured normal to the length $L_2$ and normal to a local direction of the RMC or passageway within the part. Given this frame of reference, a width of the feedcore trunk or its associated passageway trunk is shown as $L_1$ where $L_1$ identifies the maximum such width. An alternative measurement for $L_1$ may be an overall average width or a weighted average width. An exemplary separation $T_3$ between each feed passageway trunk 70A-70C and the adjacent passageway trunks 72A-72C and 74A-74C is 50-300% of $T_2$ (e.g., as a mean or median). Such $L_2$ and $L_3$ may exist throughout the entire root (e.g., from the ID face to the airfoil) or at least along the fir-tree portion or at least along 50% of either such region.

For example, at a gross level, relationships between $L_1$ and $L_2$ may be characterized based upon maximum values. More precisely, however, and especially for feed passageways of relatively trapezoidal (or otherwise eccentric configuration) a weighted measurement of $L_1$ may best be related to the desired corresponding $L_2$. For example, in such a case $L_1$ might be measured as the average value over the adjacent half of the corresponding thickness T. Thus, advantageous $L_2$ may be more directly associated with a corresponding $L_1$ value reflecting the local dimensions of the associated feed passageway trunk to keep the edges of the RMC-cast passageway trunk out of the high stress areas around the feed passageway trunks. With this in mind, and as discussed previously, exemplary $L_2$ is less than 90% of the corresponding $L_1$, more narrowly, 40-90%, more narrowly, 50-80%, or 60-75%.

The RMC trunk and resulting passageway trunk may be approximately centrally aligned with the feedcore trunk and associated passageway trunk. For example, they may be approximately centered relative to the direction 1000. In such a situation, the edges of the RMC trunk and associated passageway trunk would be recessed relative to the projection of $L_1$ by a distance $L_3$. Exemplary $L_3$ is thus a minimum of 5% for exemplary $L_2$ being 90% of L. Exemplary $L_3$ is correspondingly larger for smaller $L_2$.

One or more embodiments have been described. Nevertheless, it will be understood that various modifications may be made. For example, the principles may be implemented using modifications of various existing or yet-developed processes, apparatus, or resulting cast article structures (e.g., in a reengineering of a baseline cast article to modify cooling passageway configuration). In any such implementation, details of the baseline process, apparatus, or article may influence details of the particular implementation. Accordingly, other embodiments are within the scope of the following claims.

What is claimed is:

1. A pattern for casting a component having an airfoil, the pattern comprising:
    a pattern material having an airfoil portion; and
    a casting core combination at least partially embedded in the pattern material and comprising:
        a metallic casting core having opposite first and second faces; and
        at least one additional casting core, the metallic casting core and at least one additional casting core extending spanwise into the airfoil of the pattern material, wherein:
        at least in a portion of the pattern material outside the airfoil of the pattern material, an edge portion of the metallic casting core is recessed relative to the cross-section of an adjacent portion of the at least one additional casting core.

2. The pattern of claim 1 wherein:
    the at least one additional casting core comprises at least one ceramic feedcore; and
    a trunk of said ceramic feedcore forms said adjacent portion.

3. The pattern of claim 1 wherein:
    the component is a blade;
    the pattern material has a fir-tree root portion; and
    said adjacent portion of the at least one additional casting core extends at least partially within the root portion of the pattern material.

4. The pattern of claim 1 wherein:
    the edge portion is recessed by a distance $L_3$ of at least 5% of a maximum length $L_1$ of the adjacent section of the at least one additional casting core.

5. The pattern of claim 1 wherein:
    the edge portion is a leading edge portion, and a trailing edge portion is also recessed.

6. The pattern of claim 1 wherein:
    a length $L_2$ of the cross-section of the metallic casting core is 50-80% of an adjacent length $L_1$ of the cross-section of the at least one additional casting core.

7. The pattern of claim 1 wherein:
    a first said metallic casting core is along a first side of said adjacent portion and a second said metallic casting core is along a second side of said adjacent portion.

8. The pattern of claim 1 wherein:
the first and second faces are parallel.

9. The pattern of claim 8 wherein:
a thickness between said first and second faces is 0.2-2.5 mm over a majority of an area of the metallic casting core.

10. The pattern of claim 1 wherein:
the metallic casting core has a protrusion for positioning the metallic casting core relative to the at least one additional casting core.

11. A method for forming the pattern of claim 1 comprising:
forming the metallic casting core form sheetstock;
molding the at least one additional core of a ceramic; and
assembling the metallic core to the at least one additional core.

12. The method of claim 11 further comprising:
molding the pattern material at least partially over the casting core combination for forming a pattern.

13. A method for casting comprising:
forming, according to claim 12, a pattern;
shelling the pattern;
removing the pattern material from the shelled pattern for forming a shell;
introducing molten alloy to the shell; and
removing the shell and casting core combination.

14. The method of claim 12 used to form a gas turbine engine component.

15. A gas turbine engine component comprising:
an airfoil having:
a leading edge;
a trailing edge;
a pressure side extending between the leading edge and trailing edge;
a suction side extending between the leading edge and trailing edge; and
one or more cooling passageways extending through the airfoil and comprising a trunk extending from an inlet,
wherein:
at said inlet, there is an additional passageway adjacent the trunk and having at least one edge recessed relative to the trunk.

16. The component of claim 15 wherein:
the component is a blade and the inlet is in an ID face of a fir-tree root of the blade.

17. The component of claim 15 wherein:
there are a first said additional passageway and a second said additional passageway on opposite sides of said trunk at said inlet.

18. The component of claim 15 wherein:
the edge is a leading edge, and a trailing edge is also recessed relative to the trunk.

19. The component of claim 18 wherein:
a length between the leading edge and trailing edge is 50-80% of a maximum length of the adjacent cross-section of the trunk.

* * * * *